US011980828B2

(12) United States Patent
Thompson

(10) Patent No.: US 11,980,828 B2
(45) Date of Patent: May 14, 2024

(54) CUSTOM MULTI-COLORED IMAGES APPLIED TO THREE DIMENSIONAL PRODUCTS, SUCH AS POLYSTYRENE POST PRODUCTION ON AN INDIVIDUAL BASIS

(71) Applicant: Slab Dream Lab, LLC, Athens, GA (US)

(72) Inventor: Robert Lyle Thompson, Nicholson, GA (US)

(73) Assignee: SLAB DREAM LAB, LLC, Athens, GA (US)

( * ) Notice: Subject to any disclaimer, the term of this patent is extended or adjusted under 35 U.S.C. 154(b) by 0 days.

(21) Appl. No.: 18/097,118

(22) Filed: Jan. 13, 2023

(65) Prior Publication Data

US 2023/0166196 A1 Jun. 1, 2023

Related U.S. Application Data

(63) Continuation of application No. 14/707,499, filed on May 8, 2015, now Pat. No. 11,590,431.

(Continued)

(51) Int. Cl.

*A63H 33/08* (2006.01)

*A63H 33/04* (2006.01)

(Continued)

(52) U.S. Cl.

CPC ............. *A63H 33/08* (2013.01); *A63H 33/04* (2013.01); *A63H 33/086* (2013.01); *A63H 33/14* (2013.01);

(Continued)

(58) Field of Classification Search

CPC ...... A63H 33/06; A63H 33/065; A63H 33/08; A63H 33/088; A63H 33/086; A63H 33/04

(Continued)

(56) References Cited

U.S. PATENT DOCUMENTS 1,277,832 A 9/1918 Beckley
2,069,362 A 2/1937 Ford (Continued)

FOREIGN PATENT DOCUMENTS

EP 0 117 707 A2 9/1984
EP 1 557 212 A1 7/2005

(Continued)

OTHER PUBLICATIONS

European Search Report, dated Dec. 17, 2019, for European Patent Application No. EP 19 195 702 (2 pages).

(Continued)

*Primary Examiner* — Joseph B Baldori

(74) *Attorney, Agent, or Firm* — Smith, Gambrell & Russell, LLP

(57) ABSTRACT

A base plate for supporting a plurality of interlocking building bricks includes a planar sheet having a top surface and a bottom surface, with a plurality of nodes projecting from the top surface. The plurality of nodes includes a node having a vertical cylindrical wall and a horizontal top wall, the vertical cylindrical wall tapering along its vertical height; the node also having a bevel extending around a circumference of the node at an edge where the vertical cylindrical wall transitions to the horizontal top wall. A method of assembling a composite base plate includes securing two component base plates to one another via a common backing material. A method of printing on a base plate includes applying ultraviolet ink to at least the top surface of the base plate from an ultraviolet light printer, the base plate having a plurality of studs or nodes projecting from the top surface.

11 Claims, 8 Drawing Sheets

Related U.S. Application Data

(60) Provisional application No. 61/991,021, filed on May 9, 2014.

(51) Int. Cl.

| | |
|---|---|
| ***A63H 33/14*** | (2006.01) |
| ***B41F 17/24*** | (2006.01) |
| ***B41J 3/407*** | (2006.01) |
| ***B41J 11/00*** | (2006.01) |

(52) U.S. Cl.

CPC ............. *B41F 17/24* (2013.01); *B41J 3/4073* (2013.01); *B41J 11/00214* (2021.01)

(58) Field of Classification Search

USPC ........ 446/114, 115, 116, 118, 120, 121, 124, 446/125

See application file for complete search history.

(56) References Cited

U.S. PATENT DOCUMENTS

| | | | | |
|---|---|---|---|---|
| 2,119,921 | A | 6/1938 | Levy | |
| 2,431,035 | A | 11/1947 | Goepfert et al. | |
| 2,757,934 | A | 8/1956 | Dunbar | |
| 2,794,726 | A | 6/1957 | Riedesel et al. | |
| 2,810,233 | A | 10/1957 | Jakobsen | |
| 3,005,282 | A | 10/1961 | Christiansen | |
| 3,481,068 | A | 12/1969 | Paulson | |
| 3,579,859 | A | 5/1971 | Malenge | |
| 3,594,940 | A | 7/1971 | Yonezawa | |
| 3,611,609 | A | 10/1971 | Reijnhard | |
| 3,640,017 | A | 2/1972 | Christiansen | |
| 3,719,003 | A | 3/1973 | Skjoldborg | |
| 3,872,629 | A | 3/1975 | Malloy | |
| 3,895,456 | A | 7/1975 | Fabre | |
| 3,939,581 | A | 2/1976 | Clarke, Jr. | |
| 4,072,099 | A | 2/1978 | Martin | |
| 4,183,167 | A | 1/1980 | Jatich | |
| 4,226,594 | A | 10/1980 | Renaut | |
| 4,270,303 | A | 6/1981 | Xanthopoulos et al. | |
| 4,287,693 | A | 9/1981 | Collette | |
| 4,297,816 | A | 11/1981 | Kella et al. | |
| 4,468,910 | A | 9/1984 | Morrison | |
| 4,509,930 | A | 4/1985 | Schweigert et al. | |
| 4,564,450 | A | 1/1986 | Piper et al. | |
| 4,606,732 | A | 8/1986 | Lyman | |
| 5,344,143 | A | 9/1994 | Yule | |
| 5,355,794 | A * | 10/1994 | Freudenheim | B41M 1/125 399/290 |
| 5,667,850 | A | 9/1997 | Gaven et al. | |
| 5,779,515 | A | 7/1998 | Chung | |
| 5,833,465 | A | 11/1998 | Jarzewiak | |
| 5,934,037 | A | 8/1999 | Bundra | |
| 6,102,766 | A | 8/2000 | Leadbetter et al. | |
| 6,136,273 | A | 10/2000 | Seguin et al. | |
| 6,443,796 | B1 | 9/2002 | Shackelford | |
| 6,508,690 | B2 | 1/2003 | Axelrad | |
| 6,634,920 | B1 | 10/2003 | Michaelsen | |
| 6,755,518 | B2 * | 6/2004 | Codos | B41J 2/01 347/102 |
| 6,794,001 | B2 | 9/2004 | Chen et al. | |
| 6,997,771 | B1 * | 2/2006 | Lucier | A63H 33/04 446/128 |
| 7,182,667 | B2 * | 2/2007 | Wittmeyer, Jr. | G09B 11/06 434/84 |
| 7,229,334 | B2 | 6/2007 | Ishikawa | |
| 7,547,109 | B2 * | 6/2009 | Schmidt | B43K 29/02 362/118 |
| 7,638,780 | B2 * | 12/2009 | Kilburn | F26B 3/28 118/620 |
| 7,666,054 | B2 | 2/2010 | Glickman et al. | |
| 8,403,723 | B1 | 3/2013 | Haner | |
| 8,807,735 | B2 * | 8/2014 | Houjou | B41J 25/001 347/102 |
| 8,808,492 | B2 | 8/2014 | Huang et al. | |
| 9,039,483 | B2 * | 5/2015 | Hernandez | A63H 3/36 446/268 |
| 9,254,687 | B2 * | 2/2016 | Ohnishi | B41M 3/12 |
| 9,393,803 | B2 * | 7/2016 | Ando | B41J 2/21 |
| 9,480,931 | B1 | 11/2016 | Samo et al. | |
| 9,636,905 | B2 * | 5/2017 | Miller | G01J 5/48 |
| 9,937,434 | B2 * | 4/2018 | Yasuda | C09K 9/02 |
| 11,590,431 | B2 | 2/2023 | Thompson | |
| 11,642,606 | B1 * | 5/2023 | Sleman | A63H 33/22 29/407.1 |
| 2004/0082258 | A1 * | 4/2004 | Kim | A63H 18/02 446/85 |
| 2005/0097860 | A1 | 5/2005 | Martensson | |
| 2006/0146109 | A1 * | 7/2006 | Goodyer | B41J 11/00214 347/102 |
| 2007/0104036 | A1 * | 5/2007 | Prax | G09B 7/063 369/1 |
| 2008/0211866 | A1 * | 9/2008 | Hill | B41M 3/008 347/42 |
| 2010/0141696 | A1 * | 6/2010 | Fujisawa | B41J 2/2114 347/16 |
| 2010/0244428 | A1 * | 9/2010 | Hoshiyama | B42D 25/00 283/94 |
| 2011/0020562 | A1 * | 1/2011 | Fujisawa | B41J 11/0021 427/487 |
| 2011/0045733 | A1 | 2/2011 | Saigo et al. | |
| 2011/0081823 | A1 | 4/2011 | Christopherson | |
| 2011/0262715 | A1 | 10/2011 | Nyfords et al. | |
| 2012/0147074 | A1 | 6/2012 | Ikeda et al. | |
| 2013/0026337 | A1 | 1/2013 | Svensson | |
| 2014/0116276 | A1 * | 5/2014 | Bird | H04W 8/16 101/424.1 |
| 2014/0120798 | A1 | 5/2014 | Finn | |
| 2016/0346708 | A1 | 12/2016 | Yim | |

FOREIGN PATENT DOCUMENTS

| | | |
|---|---|---|
| EP | 2 712 736 | 4/2014 |
| GB | 263 865 | 6/1927 |
| GB | 1 225 394 A | 3/1971 |
| KR | 200 394 555 | 9/2005 |
| WO | 2010/087037 A1 | 8/2010 |

OTHER PUBLICATIONS

Extended European Search Report, dated Dec. 17, 2019, for European Patent Application No. EP 19 195 702 (4 pages).

Provisional Opinion and Supplemental Partial European Search Report dated Jan. 18, 2023 for European Patent Application No. 15789761.2 (14 pages).

Extended European Search Report, dated May 4, 2018, for European Patent Application No. 15789761.2 (12 pages).

Communication from the Examining Division, mailed May 9, 2019, for European Patent Application No. 15789761.2 (7 pages).

International Search Report and Written Opinion of the International Searching Authority, dated Aug. 20, 2015, for International Patent Application No. PCT/US2015/029881 (8 pages).

* cited by examiner

FIG. #1
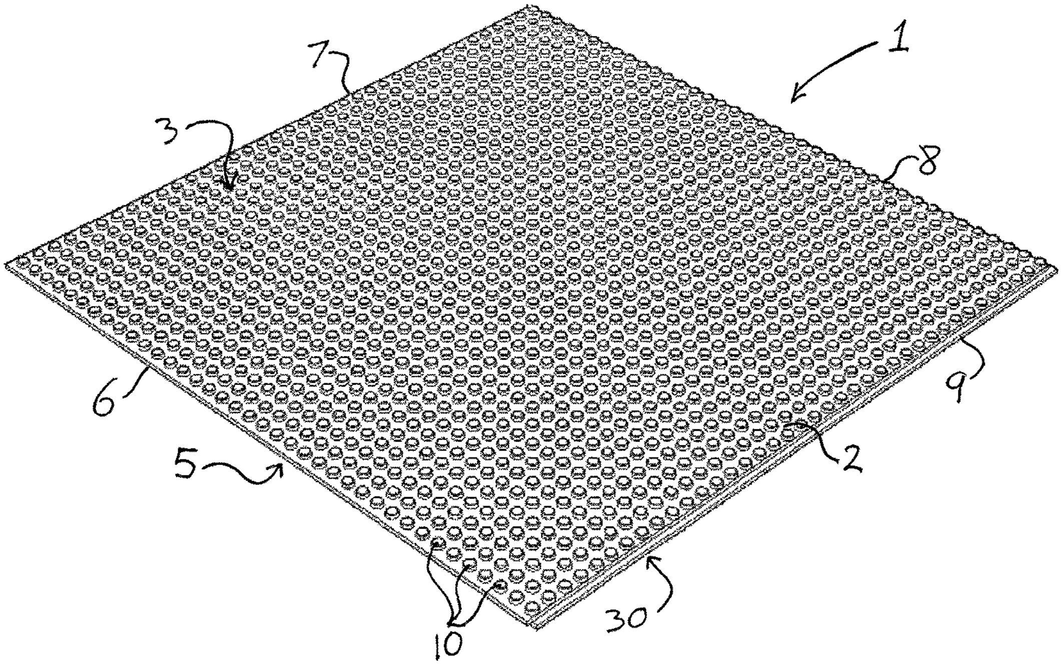
FIG. #2
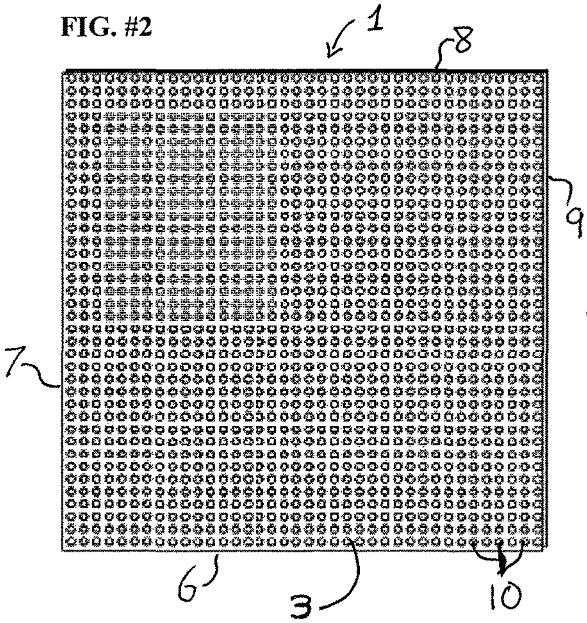
FIG. #3
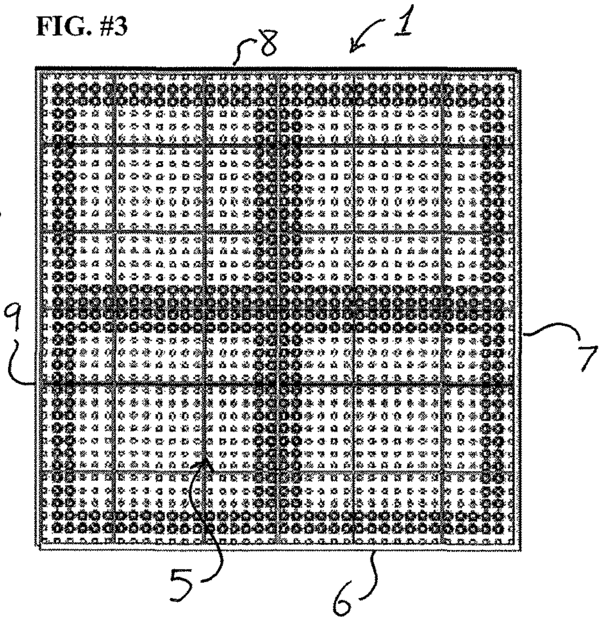

FIG. #4
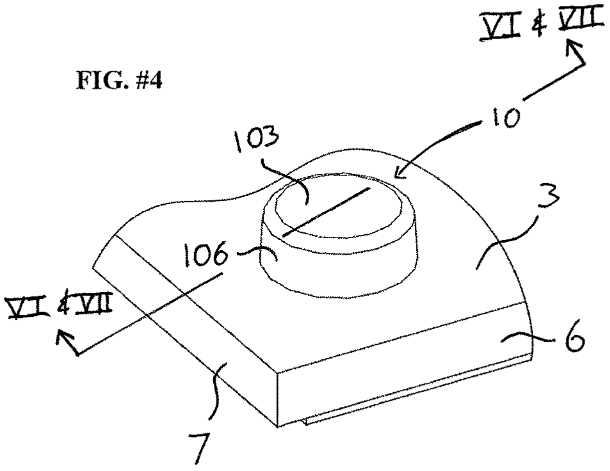
FIG. #5
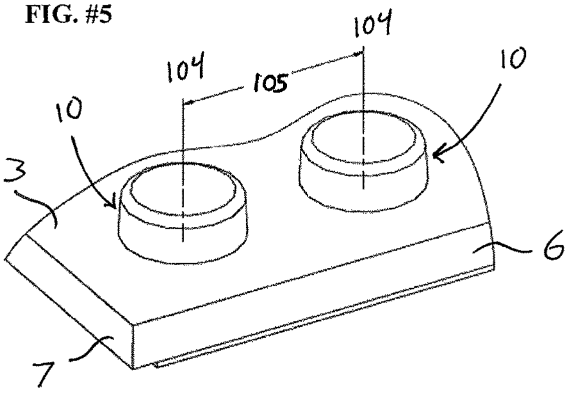
FIG. #6
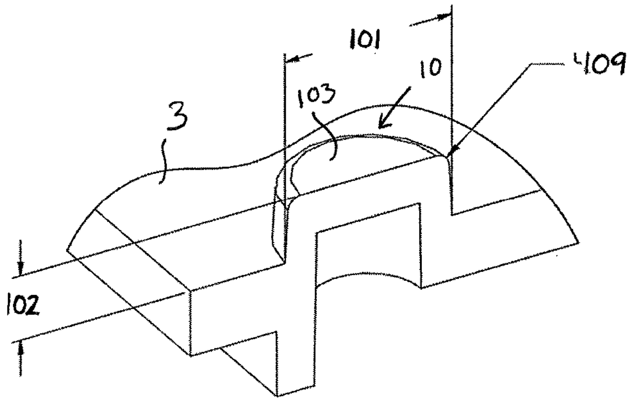
FIG. #7
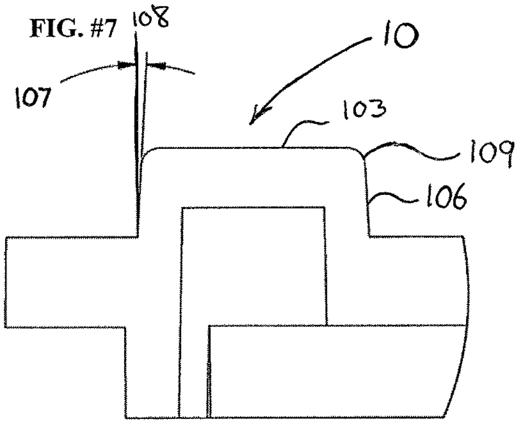

FIG. #8
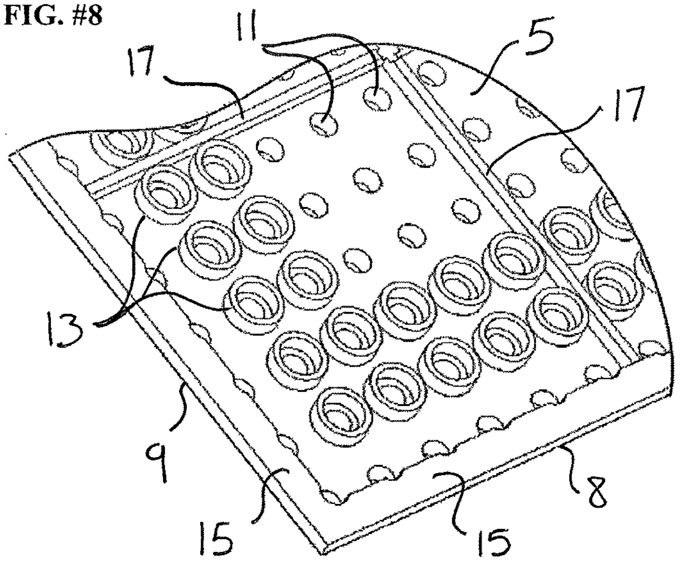
FIG. #9
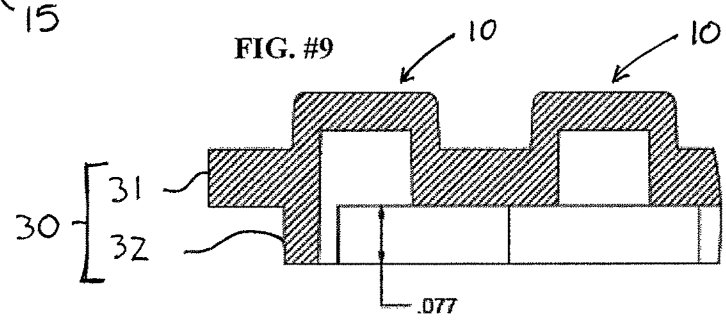
FIG. #10
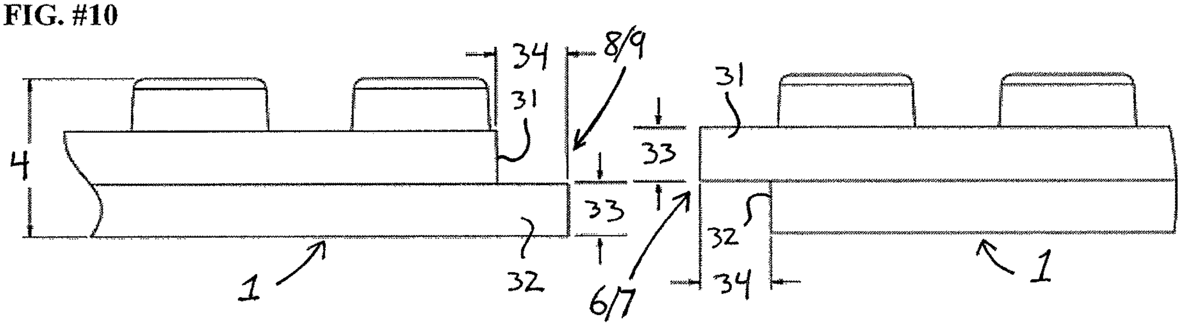
FIG. #11
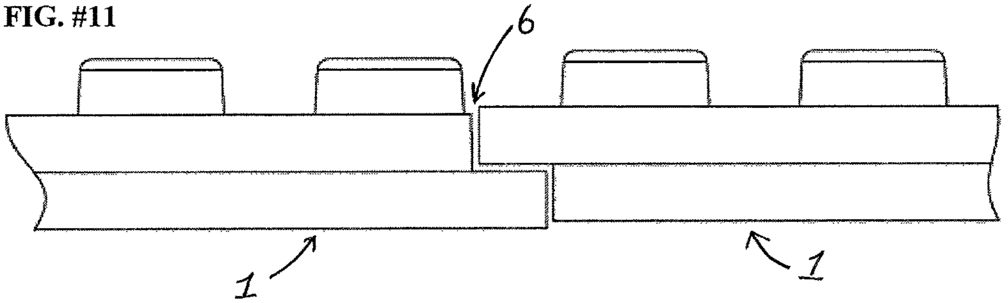

FIG. #12
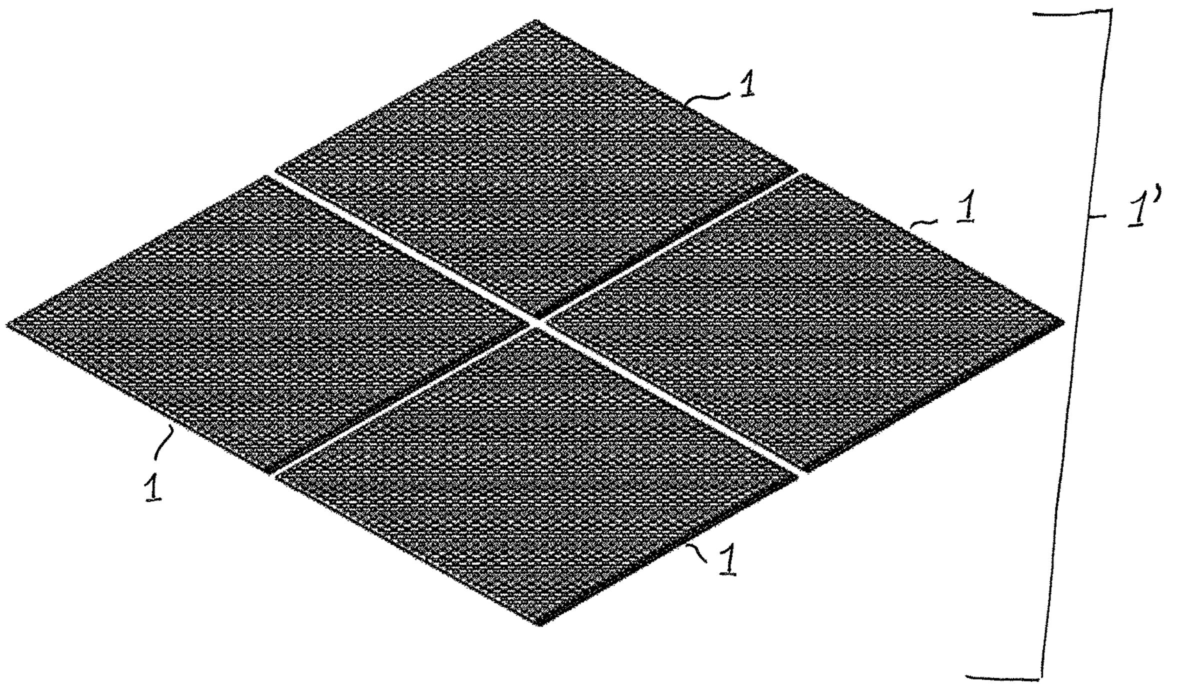

FIG. #13
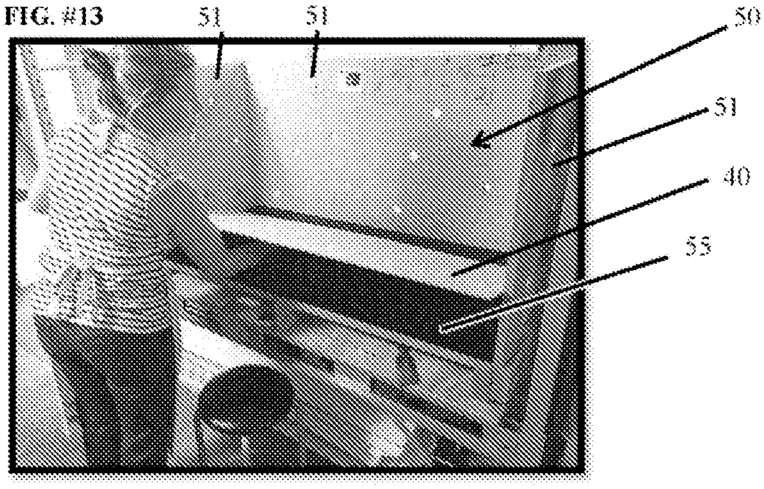
FIG. #14
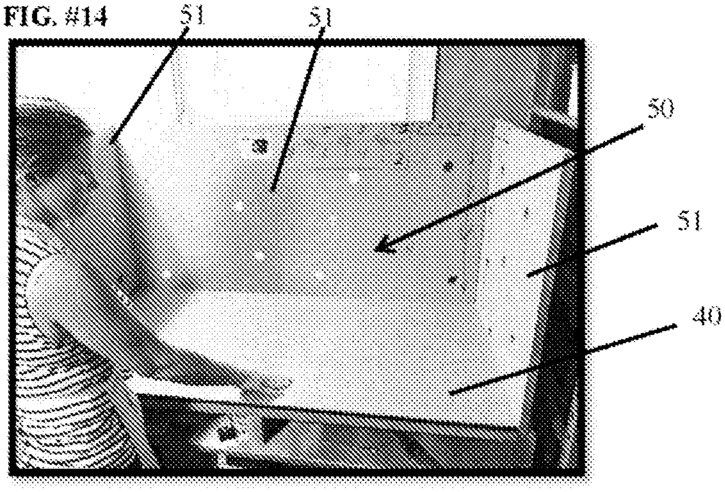
FIG. #15
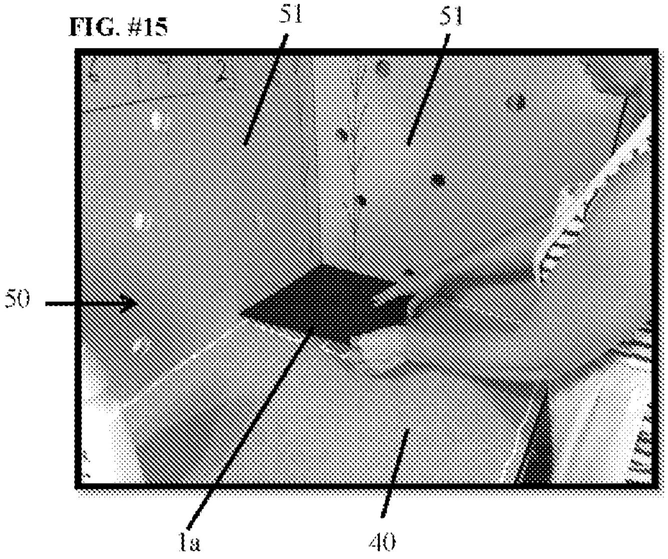

FIG. #16
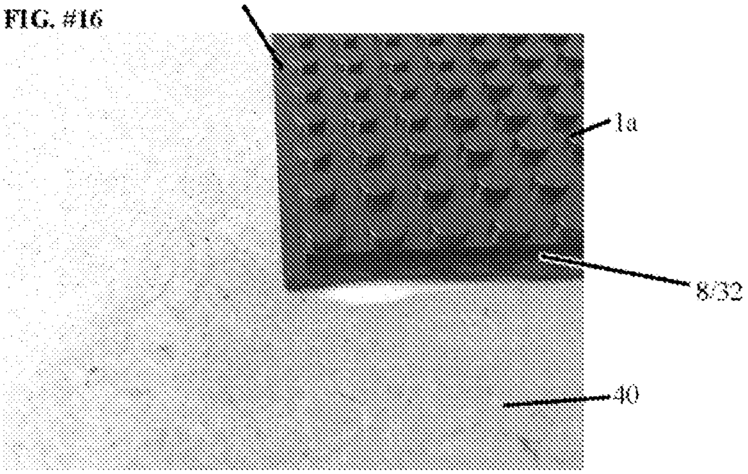
FIG. #17
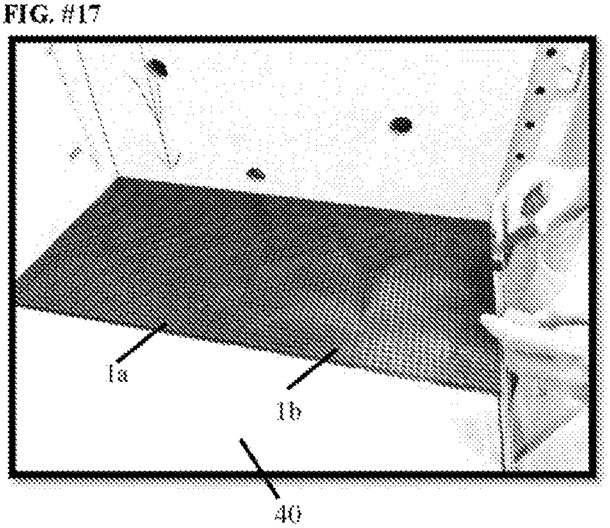
FIG. #18
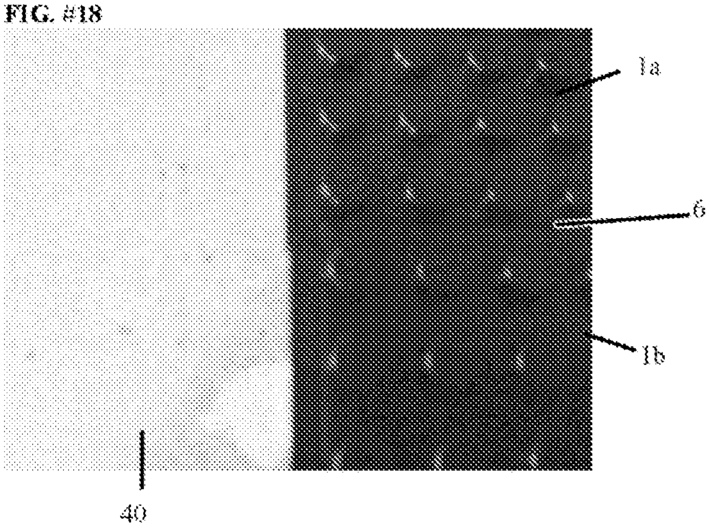

FIG. #19
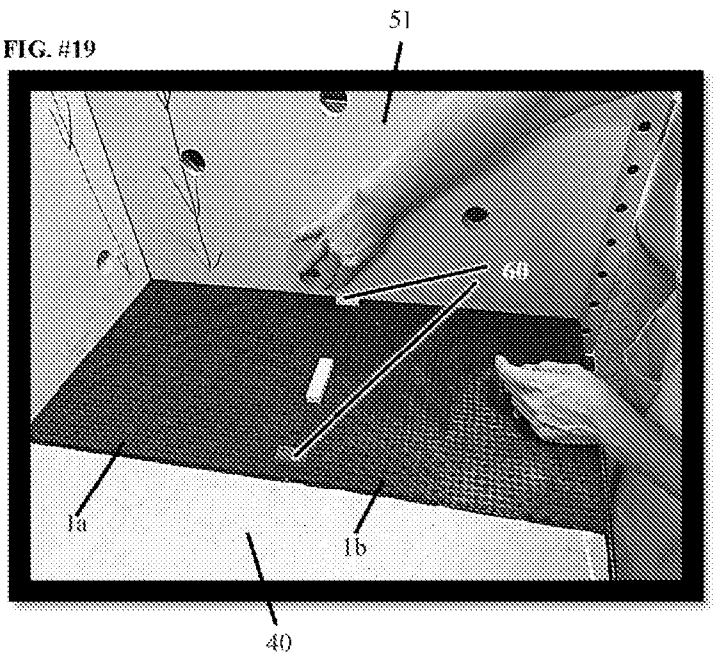
FIG. #20
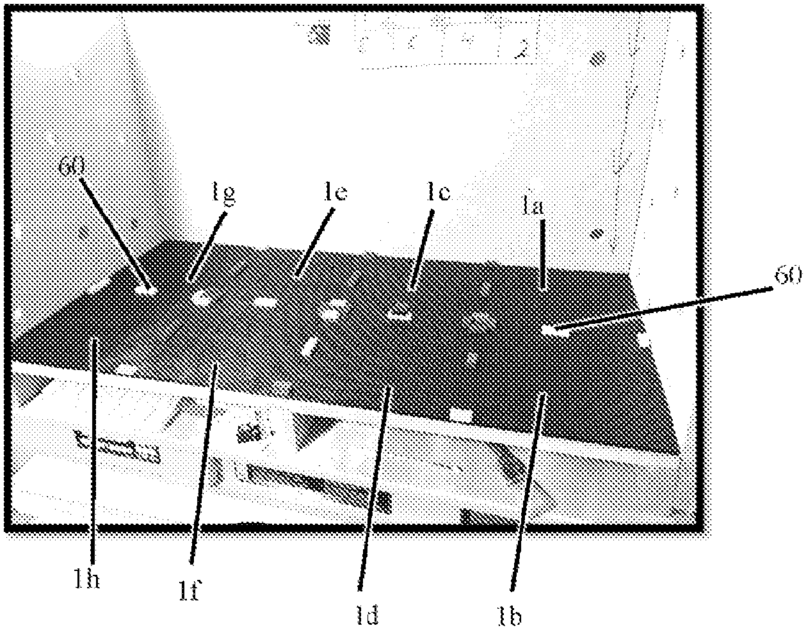

FIG. #21
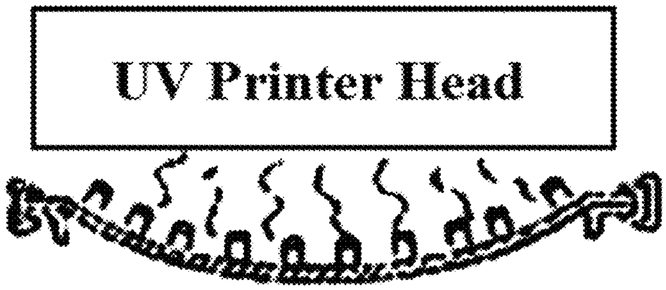
FIG. #22
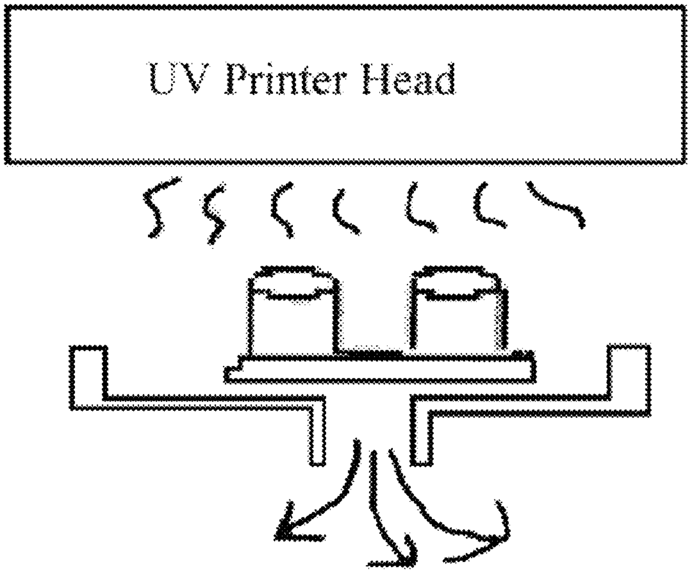

CUSTOM MULTI-COLORED IMAGES APPLIED TO THREE DIMENSIONAL PRODUCTS, SUCH AS POLYSTYRENE POST PRODUCTION ON AN INDIVIDUAL BASIS

CROSS-REFERENCE TO RELATED APPLICATIONS

This application claims priority of U.S. provisional application 61/991,021, filed May 9, 2014; the entire contents of which are incorporated herein by reference.

FIELD OF THE INVENTION

The present invention relates to products and methods in the field of interlocking building bricks. In particular, the present invention is directed to base plates for use with interlocking building bricks, methods of manufacturing base plates, and methods of applying custom colors and images to base plates.

BACKGROUND OF THE INVENTION

Interlocking building bricks are old and well known; perhaps the most well-known of which are LEGO bricks, as sold by The LEGO Group under the trademark LEGO. The LEGO Group was founded in 1932 by Ole Kirk Kristiansen. The company has passed from father to son and is now owned by Kjeld Kirk Kristiansen, a grandchild of the founder. The LEGO brick is their most important product. This was twice “Toy of the Century”. Their products have undergone extensive development over the years—but the foundation remains the traditional LEGO brick. The LEGO brick in its present form was launched in 1958; and granted U.S. Pat. No. 3,005,282, the content of which is incorporated herein.

The interlocking principle of the LEGO brick, with projecting studs on one side and recessed tubes on the other, offers unlimited building possibilities. Any number of LEGO bricks may be joined with one another to construct increasingly complex structures. As a foundational support for LEGO brick constructions, there are what are known in the art as base plates. Base plates are relatively flat, planar sheets having a number of studs on one side for attaining an interlocking engagement with the tubes of LEGO bricks. Owing to their relatively flat, planar form, base plates are able to provide increased stability to LEGO brick constructions that are engaged with the studs of the base plate.

However, conventional base plates are generally mass-produced in only limited sizes of fixed dimensions—such as, for example, plastic sheets of 8 inches by 8 inches, or 15 inches by 15 inches. In particular, the LEGO brick market has not been served by having building base plates larger than 15 inches in size. This restricts the utility of conventional base plates. For example, consumers wishing to assemble relatively large LEGO brick constructions are required to utilize multiple base plates to achieve adequate support for the construction. Also, as conventional base plates lack any structure for directly interlinking or combining separate base plates with one another, the consumer is required to join the separate base plates by use of an extra engagement structure—such as by adhering the separate plates to one another, or to a common backing, via nails, staples, or glue. Furthermore, due to their relatively thin construction from plastic materials, conventional base plates are often easily deformed and damaged.

Current manufacturing and production processes place a number of further limitations on conventional base plates. For example, the application of color and/or images to base plates, in accord with current manufacturing methods, is complicated by the three dimensional structure of the base plates owing to the projecting studs on their top surface. As a result, traditional approaches for applying color or images to base plates require a wet or in-production process that facilitates mass-scale production. For example, conventional base plates provided in a single solid color, may be produced by introducing coloring additives to the plastic mixture prior to shape-forming the base plate. In the case of colored images, the traditional process is to employ large volumes of single images which are applied to the base plates in a water-bath process during a production stage. This water-bath process is relatively expensive. Currently there are no suitable methods for applying traditional printing processes, i.e., laser, alcohol, or water-soluble printing, to the three dimensional structure of a base plate with projecting studs.

The foregoing limitations concerning the application of color and images to conventional base plates are problematic for consumers who seek to assemble elaborate LEGO brick constructions with an uniform visual appearance or theme. In particular, many consumers prefer for the base plate to present an appearance that compliments the appearance of the LEGO brick construction(s) supported thereon. For example, a LEGO brick construction of a city block will preferably be supported by a base plate having a complimenting city street theme; whereas a LEGO brick construction of a moon station will preferably be supported by a base plate having a complimenting mono surface theme. Unfortunately, current manufacturing methods do not allow for customization to the appearance of conventional base plates; and there is currently no process available on the market that enables consumers to choose and apply their own image, artwork, graphics, or themes to post-production base plates on a single count or mass basis. Instead, consumers seeking colored base plates are restricted to only those colors the manufactures mass-produce, which are typically limited to specific plastic colors. Meanwhile, consumers seeking base plates with a preferred image or theme (e.g., an environmental appearance) must make do with the select images the manufactures offer in mass-production, which often do not provide a preferred appearance or theme.

Currently, there is no known method for applying a high quality image, artwork, graphic, or theme to a post-production base plate. Instead, the only recourse for a consumer who seeks a base plate with a custom color or image, is to hand paint over a base color or image that a manufacturer has selected for mass-production. Unfortunately, hand painted colors and images are generally of relatively poor quality and often quickly degrade due to scratches that result from the frictional forces incurred when engaging LEGO bricks with the studs projecting from the base plate surface.

Accordingly, there remains a need in the art for base plates having a variety of sizes other than those conventionally available; including sizes having at least one dimension of more than 15 inches. There also remains a need in the art for base plates of more robust and durable construction. There remains a further need in the art for a method of customizing the appearance of base plates; including a method of applying custom colors and images to a post-production base plate in a durable, scratch-resistant manner.

SUMMARY OF THE INVENTION

The present invention is directed to a base plate for supporting a plurality of interlocking building bricks, the base plate including a planar sheet having a top surface and a bottom surface, with a plurality of nodes projecting from the top surface. The plurality of nodes includes a node having a vertical cylindrical wall and a horizontal top wall, the vertical cylindrical wall tapering along its vertical height; the node also having a bevel extending around a circumference of the node at an edge where the vertical cylindrical wall transitions to the horizontal top wall.

The bevel extending around the circumference of the node is a rounded bevel. The vertical cylindrical wall has a diameter that tapers along the vertical height of the vertical cylindrical wall; the diameter of the vertical cylindrical wall tapering continuously from a base of the node to the bevel extending around the circumference of the node. The taper of the vertical cylindrical wall has a taper angle ranging from about 2° to about 4°, which is preferably 3°, as measured relative to an axis extending perpendicular to top surface of the planar sheet.

The planar sheet includes a first interlocking mechanism extending along a first peripheral edge, and a second interlocking mechanism extending along a second peripheral edge, the first and second interlocking mechanisms being adapted to mate with one another such that the base plate is capable of mating with another base plate of the same construction. The interlocking mechanism along the first peripheral edge is in the form of a two-tier annular ledge having a top ledge and a bottom ledge, the top ledge extending further horizontally from the planar sheet than the bottom ledge; and the interlocking mechanism along the second peripheral edge is also in the form of a two-tier annular ledge including a top ledge and a bottom ledge, the bottom ledge extending further horizontally from the planar sheet than the top ledge.

A method of assembling a composite base plate includes positioning a first component base plate having a first interlocking mechanism extending along a peripheral edge to align with a second component base plate having a second interlocking mechanism extending along a peripheral edge. Aligning of the first and second component base plates includes mating the first interlocking mechanism with the second interlocking mechanism. The first component base plate is secured to the second component base plate by a bonding material that is applied to at least one of: [i] a backing material to which the two component base plates are commonly secured; and [ii] the first and second interlocking mechanisms.

A method of printing on a base plate includes applying ultraviolet ink to at least the top surface of the base plate from an ultraviolet light printer, the base plate having a plurality of studs or nodes projecting from the top surface. The ultraviolet ink is applied to the base plate while the base plate is supported on a backing board made of a vacuum enhancing material, while the base plate is subjected to a downward vacuum force. The UV ink is applied to a node having a vertical cylindrical wall and a horizontal top wall, the vertical cylindrical wall tapering along its vertical height. The node to which the UV ink is applied further including a bevel extending around a circumference of the node at an edge where the vertical cylindrical wall transitions to the horizontal top wall. The UV ink is applied to the base plate while the base plate is supported on a backing board on which a second base plate is also supported, and UV ink is also applied to the second base plate.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below:

FIG. 1 is a perspective view of a base plate according to the present invention;

FIG. 2 is a top plan view of the base plate in FIG. 1;

FIG. 3 is a bottom plan view of the base plate in FIG. 1;

FIG. 4 is a perspective view of a node on the base plate of FIG. 1;

FIG. 5 is a perspective view of two nodes on the base plate of FIG. 1;

FIG. 6 is a perspective cross-sectional view of the node in FIG. 4;

FIG. 7 is a profile cross-sectional view of the node in FIG. 4;

FIG. 8 is a close-up, perspective view of the bottom surface of the base plate in FIG. 1;

FIG. 9 is a close-up, profile, cross-sectional view of the base plate in FIG. 1;

FIG. 10 shows the interlocking mechanisms of two base plates such as that shown in FIG. 1;

FIG. 11 shows a mating alignment of the two base plates in FIG. 10;

FIG. 12 is a perspective view of multiple base plates, such as that in FIG. 1, aligned with one another;

FIG. 13 shows a forming container into which a backing board is being placed;

FIG. 14 shows the forming container of FIG. 13, with the backing board resting flatly therein;

FIG. 15 shows a component base plate being placed on the backing board resting in the forming container of FIG. 13;

FIG. 16 shows a close-up view of the component base plate in FIG. 15;

FIG. 17 shows two component base plates resting on the backing board resting in the forming container of FIG. 13;

FIG. 18 shows a close up of the two component base plates of FIG. 17;

FIG. 19 shows the two component base plates of FIG. 17 secured to one another via securing means;

FIG. 20 shows a plurality of component base plates resting on the backing board in the forming container of FIG. 13, during a drying duration;

FIG. 21 is a schematic illustrating the application of UV ink to a base plate in a UV light printer, without use of a backing board or a vacuum force; and FIG. 22 is a schematic illustrating the application of UV ink to a base plate in a UV light printer, with the base plate supported on a backing board and subjected to a downward vacuum force.

DETAILED DESCRIPTION OF THE INVENTION

The following disclosure discusses the present invention with reference to the examples shown in the accompanying drawings, though the invention is not limited to those examples.

The present invention is directed to base plates for use with interlocking building bricks, methods of manufacturing base plates, and methods of applying custom colors and images to base plates. More particularly, the present invention relates to base plates, or "tiles", for use with interlocking building bricks in the plastics toy market; and methods of manufacturing such base plates. The base plates may be engineered for mounting in various ways, such as on floors, walls, and other substrates. The base plates may also be provide with interlocking mechanisms, and an engineered backing for a stronger more durable design. The present invention also relates to methods of printing colors and images onto post-production base plates with an ultraviolet (UV) light printer.

References herein to "post-production base plates" are to be understood as referring to base plates that have been manufactured to a point where studs (or the inventive nodes) have been formed to project from a surface of the base plate.

FIG. 1 shows one example of a base plate 1 according to the present invention. The base plate 1 in this example is a relatively flat, planar sheet 2 measuring 12 inches by 12 inches. On a top surface 3 of the base plate 1, as shown in FIGS. 1-2, there is provided a plurality of nodes 10. On a bottom surface 5 of the base plate 1, as shown in FIG. 3, there is provided a plurality of cavities 11 (corresponding to the raised nodes 10 on the top surface 3); a plurality of barrels 13; and a number of reinforcing ridges 15/17. The base plate 1 has a height 4, as measured from a bottom of the back surface to a top of a node 10, of about 0.227 inches. An interlocking mechanism 30, in the form of a two-tiered annular ledge, extends along the peripheral edges 6-9 of the base plate 1

Base plates according to the present invention may be manufactured through use of a Computer Aided Design (CAD) program for modeling the desired shape and dimensions of a target base plate 1. A CAD program may be used to generate an injection molding model for a base plate 1; and a die head may then be fabricated to the specifications of the CAD-generated model from a material suitable for use in injection molding, such as steel, aluminum and the like.

The fabricated die head is then placed in an injection molding machine, which may pressure feed a heated quantity of molding material to the die head via multiple gate injection. The heated material may be high-impact polystyrene, or any other material suitable for injection molding. The injection molding machine may include a local supply source holding feed material for generating the molding material (e.g., a supply container of polystyrene resin pellets), and a control unit for subjecting the feed material to suitable temperature, pressure, and volume conditions for compressing the feed material to generate the molding material, and then feeding that mold material to completely fill the die head.

Once filled with mold material, the die head is cooled until the mold material hardens into the base plate shape defined by the die head; and a molded base plate is then ejected from the die head and sent for post-production processing.

In the example illustrated in FIGS. 1-3, the base plate 1 has a 38×38 node matrix, providing a total of 1,444 nodes 10. FIGS. 4-7 show an example of a node 10. In this example, the node 10 has a diameter 101 measuring 0.195 inches and a height 102 measuring 0.075 inches; and is provided with a tapered and beveled construction. The diameter 101 is measured at the base of the node 10; and the height 102 is measured from the base to the horizontal top wall 103 of the node 10. As shown in FIG. 5, nodes 10 within the node matrix are positioned such that the central vertical axes 104 of adjacent nodes 10 are separated by a distance 105, which in the illustrated example measures about 0.315 inches.

As shown in FIG. 7, the taper of the node 10 is characterized by a vertical cylindrical wall 106 that continuously decreases in diameter along its vertical height 102, as defined by a taper angle 107 between the cylindrical wall 106 and an axis 108 extending perpendicular to the top surface 3 of the base plate 1. The taper angle 107 ranges from about 2° to about 4°; and is preferably about 3°. In the instance of an injection molded node 10, the taper angle 107 may be referred to as a draft angle. As shown in FIGS. 6-7, a rounded bevel 109 extends around the circumference of the top edge of the node 10, such that there is a curved transition between the horizontal top wall 103 and the vertical cylindrical wall 106. The rounded bevel 109 has a radius of curvature ranging from about 0.015 to about 0.017; and is preferably about 0.016.

Inclusion of the rounded bevel 109 and tapered cylindrical wall 106 facilitate easier engagement of the node 10 with a mating tube on a LEGO brick. As a result, base plates 1 with the node 10 facilitate an enjoyment of LEGO bricks for those users who lack finer motor control and/or have limited muscle strength (e.g., children, senior citizens, etc.). Surprisingly, however, it has been found the node 10, with the tapered and beveled construction, provides a further benefit in that it facilitates use of the base plate 1 with a variety of different types of interlocking building bricks.

Those familiar with interlocking building bricks will appreciate that LEGO bricks and DUPLO bricks (as sold by The LEGO Group, under the trademark DUPLO) have slightly different sizing. As a result, conventional base plates that are suitable for use with LEGO bricks may not provide the desired degree of support when used with DUPLO bricks, and vice versa. Therefore, consumers often purchase separate base plates for their LEGO bricks and DUPLO bricks, and are not able to directly engage the two separate brick types to a single base plate. However, it has been found that the base plates 1, employing the node 10, are able to directly engage both LEGO bricks and DUPLO bricks with satisfactory support.

Without being bound by any particular theory, it is believed the ability of the node 10 in achieving satisfactory engagements with varying types of interlocking building bricks is due to a synergy between the rounded bevel 109 and the tapered cylindrical wall 106. It is thought the rounded bevel 109 facilitates an initial engagement of the node 10 with the differently sizes tubes of varying types of interlocking building bricks. It is considered that the tapered cylindrical wall 106 then facilitates a further pressing of the initially engaged brick into yet further engagement with the base plate 1 with a concurrent increase in frictional forces between the nodes 10 and the tubes of the brick (owing to the increase in node diameter at points closer to the node base). In this way, it is believed the increasing diameter of the node 10 allows different brick types to each attain satisfactory engagement by permitting different brick types to reach optimal engagement points at different points along the height 102 of the tapering nodes 10; and/or by generating a slight deformation in the engaging walls of the different brick types via a wedging force incurred as the brick is pressed against the tapered nodes 10.

When viewing the bottom surface 5 of the base plate 1, as shown in FIGS. 3 and 8, there may be seen a plurality of cavities 11 (each cavity corresponding with a node 10 that projects from the top surface 3). A number of the cavities 11 are encircled by a barrel 13. Though the illustrated example shows barrels 13 being provided at only select cavities 11 (e.g., presenting a cross pattern on the bottom surface 5 in the illustrated example), it is to be understood that any number of barrels 13 may be provided—including fewer or more barrels 13, and including an arrangement where each cavity 11 is encircled by a barrel 13.

The barrels 13 on the bottom surface 5 of the base plate 1 are sized and shaped for mating engagement with the studs on conventional LEGO bricks. In this way, the base plate 1 may itself be used as an interlocking building brick in assembling a multi-tiered construction, such as a construction simulating an office building, a parking garage, etc. The barrels 13 are also adequately sized and shaped to mate with the nodes 10, such that a base plate 1 may be stacked atop another base plate 1. Advantageously, inclusion of the barrels 13 also provides the base plate 1 with increased rigidity and durability.

A network of ridges 15/17 project from the bottom surface 5 of the base plate 1. The ridge network includes perimeter ridges 15 extending along the perimeter of the bottom surface 5; and a number of interior ridges 17 arranged in a square grid extending along interior regions of the bottom surface 5. Though not shown in the illustrated example, it is appreciated the ridge network may take other shapes; and/or include fewer or more ridges (e.g., diagonally oriented interior ridges arranged in truss-like formation within the square grid of interior ridges 17). Inclusion of the ridge network also provides the base plate 1 with increased rigidity and durability.

Preferably, the barrels 13 and the ridge network (including the perimeter ridges 15 and interior ridges 17) project an equal distance from the bottom surface 5 of the base plate 1. In the example shown in the drawings, the barrels 13 and the ridge network project 0.077 inches from the bottom surface 5, as shown in FIG. 9. The inclusion of barrels 13 and a ridge network that project to an equal distance enables the base plate 1 to achieve not only enhanced stability for supporting LEGO brick constructions that are engaged via nodes 10, but also enhanced durability in withstanding increased applications of force, such as the weight of a grown adult walking and standing on the base plate 1.

As shown in FIGS.1-3, an interlocking mechanism 30, in the form of a two-tiered annular ledge, extends around the perimeter of the base plate 1. The two-tiered form of the interlocking mechanism 30 includes a top ledge 31 and a bottom ledge 32 that extend to different lengths in the horizontal direction of the base plate 1.

In the example shown in FIGS. 1-3, the top ledge 31 extends further in the horizontal direction than the bottom ledge 32 along two peripheral edges 6/7 of the base plate 1; and the bottom ledge 32 extends further in the horizontal direction than the top ledge 31 along the other two peripheral edges 8/9. As shown in FIG. 10, both the top and bottom ledges 31/32 have a height 33 of 0.076 inches; with the further extending ledge projecting, in both instances, a horizontal distance 34 of 0.1 inches beyond the other corresponding ledge in the two-tiered form at that respective peripheral edge. When speaking of the interlocking mechanism 30, the further projecting ledge (be it the top ledge edge 31 or the bottom ledge 32) may be referred to as a male member; and the recessed, or lesser projecting ledge (be it the top ledge edge 31 or the bottom ledge 32) may be referred to as a female member.

As shown in FIG. 11, the interlocking mechanism 30 facilitates alignment of two separate base plates 1 in a manner that enhances stability and durability of the combined base plates, while also reducing the appearance of a seam 6 between the two base plates. This may be achieved, as shown in FIG. 11, by aligning a peripheral edge 8/9 of the first base plate 1, having a further projecting bottom ledge 32, to correspond with a mating peripheral edge 6/7 of the second base plate 1, having a further projecting top ledge 31. Upon aligning the two base plates in such a manner, the further extending bottom ledge 32 of the first base plate is positioned to provide structural support to the further extending top ledge 31 of the second base plate, while at the same time presenting a minimal appearance of the seam 6 between the two base plates.

With the interlocking mechanism 30, a user may align multiple base plates 1 to provide a larger support area. For example, as shown in FIG. 12, four separate base plates 1, each measuring 12 inches by 12 inches, may be aligned with one another via the interlocking mechanisms 30 to yield a larger support area measuring 24 inches by 24 inches.

The interlocking mechanisms 30 may be used to releasably align any number of based plates 1 in this manner; such that multiple base plates 1 may be aligned for use in unison, though stored individually. Alternatively, the interlocking mechanism 30 may be used to facilitate a permanent joining of multiple base plates 1 to produce a single composite base plate 1' of larger dimensions. One exemplary method of constructing a composite base plate 1', which is itself composed of multiple post-production base plates 1, will now be explained.

In a first step, the target size for a composite base plate 1' is identified and a suitable number of post-production base plates 1 are obtained to achieve those necessary dimensions to yield the target size. For example, if seeking to construct a composite base plate 1' measuring 24 inches by 48 inches, there may be obtained eight post-production base plates 1*a*-1*h* that each separately measure 12 inches by 12 inches; and which will serve as "component base plates 1" for assembly of the composite base plate 1'. A backing board 40 of corresponding dimensions is then obtained. The backing board 40 is preferably a substrate of suitable composition, such as a medium density fiberboard (MDF), a honeycomb paper backing, or a Komatex polyvinyl chloride sheet. As shown in FIG. 13, the backing board 40 is positioned in a forming container 50 having three walls 51 and a base surface 55; the base surface 55 being made to have dimensions sufficiently sized to receive the backing board 40 in a flat orientation thereon.

The backing board 40 is placed flatly on the base surface 55 of the forming container 50 such that at least edges of the backing board 40 are flush with at least two walls 51 of the forming container 50, as shown in FIG. 14. With the backing board 40 resting on base surface 55, a quantity of bonding material is applied along the perimeter of the backing board 40. A first component base plate 1*a* is selected and a quantity of bonding material is applied along the perimeter ridge 15 on the bottom surface 5 thereof. The first component base plate 1*a* is then firmly pressed flat against the backing board 40, with two peripheral edges of the first component base plate 1*a* placed flush against two walls 51 of the forming container 50, and with the bonding material along the bottom surface 5 of the first component base plate 1*a* coming into contact with bonding material along the perimeter of the backing board 40, as shown in FIG. 15.

Preferably, the first component base plate 1*a* is placed on the backing board 40 in such an orientation that the two peripheral edges 6/7 having the further extending top ledge 31 are placed flush against the two walls 51 of the forming container 50, while the two perimeter edges 8/9 having the further extending bottom ledge 32 are exposed, as shown in FIG. 16.

Next, a second component base plate **1*b* is selected and a quantity of bonding material is applied along the perimeter ridge 15 on the bottom surface 5 thereof. The second component base plate 1*b* is then firmly pressed flat against the backing board 40, with one peripheral edge of the second component base plate 1*b* placed flush against one wall 51 of the forming container 50, and with the bonding material along the bottom surface 5 of the second component base plate 1*b* coming into contact with bonding material along the perimeter of the backing board 40, as shown in FIG. 17**.

Preferably, having oriented the first component base plate **1*a* such that the two peripheral edges 8/9 having the further extending bottom ledge 32 are exposed, the second component base plate 1*b* may now be positioned with an orientation such that a peripheral edge 6/7 having the further extending top ledge 31 is made to mate with a peripheral edge 8/9 of the first component base plate 1*a* that has the further extending bottom ledge 32 exposed, as shown in FIG. 18. In this way, the second component base plate 1*b* may be finely aligned with the first component base plate 1*a* via a simple downward pressing motion that simultaneously aligns the interlocking mechanisms of the two base plates 1*a*/1*b***.

Once the second component base plate **1*b* has been placed on the backing board 40, in alignment with the first component base plate 1*a*, the first and second component base plates 1*a*/1*b* may then be secured in the aligned positions via one or more securing means 60, as shown in FIG. 19. A suitable securing means 60 may include an interlocking building brick, which may be secured to nodes 10 projecting near the mated peripheral edges of the first and second component base plates 1*a*/1*b***.

The positioning and alignment of the component base plates **1*c*-1*h* proceeds by repeating the foregoing steps—with: component base plate 1*c* positioned such that an interlocking mechanism 30 of the component base plate 1*c* is made to align with and engage an interlocking mechanism 30 of the component base plate 1*a*; component base plate 1*d* positioned such that an interlocking mechanism 30 of the component base plate 1*d* is made to align with and engage an interlocking mechanism 30 on both component base plate 1*c* and component base plate 1*b*; component base plate 1*e* positioned such that an interlocking mechanism 30 of the component base plate 1*e* is made to align with and engage an interlocking mechanism 30 on component base plate 1*c*; component base plate 1*f* positioned such that an interlocking mechanism 30 of the component base plate if is made to align with and engage an interlocking mechanism 30 on both component base plate 1*e* and component base plate 1*d*; component base plate 1*g* positioned such that an interlocking mechanism 30 of the component base plate 1*g* is made to align with and engage an interlocking mechanism 30 on component base plate 1*e*; and component base plate 1*h* positioned such that an interlocking mechanism 30 of the component base plate 1*h* is made to align with and engage an interlocking mechanism 30 on both component base plate 1*g* and component base plate 1*f*. FIG. 20 shows the resulting arrangement with all component base plates 1*a*-1*h* positioned and secured via securing means 60**.

Once fully covered by component base plates **1*a*-1*h*, the bonding material is allowed to dry for a duration of at least 12 hours, while a pressure of at least 3 lbf/in$^2$ is applied to press the component base plates 1*a*-1*h* against the backing board 40. Optionally, the forming container 50 may include air vents to permit air flow around the backing board 40 during positioning of the component base plates 1*a*-1*h*; and/or during the drying stage. If providing an air flow to the backing board 40 during the drying stage, then the drying duration may be reduced to 6 hours. Upon completion of the drying duration, the application of surface pressure may be discontinued and the securing means 60 removed to yield a composite base plate 1' in the form of the backing board 40 with the component base plates 1*a*-1*h*** affixed thereto.

Preferably, when positioning the component base plates **1*a*-1*h* on the backing board 40, the individual component base plates 1 are positioned such that any base-plate peripheral edges 6-9 that extending substantially along a peripheral edge of the backing board 40 are made to extend slight beyond the edge of the backing boar 40 such that the interlocking mechanism 30 at that corresponding base-plate peripheral edge protrudes beyond the peripheral edge of the backing board 40. In this way, each peripheral edge of the composite base plate 1' produced hereby may be made to have an interlocking mechanism 30 for aligning with one or more other composite base plates 1'**.

Composite base plates 1' may be constructed in this manner from any number of component base plates 1. For example, a composite base plate 1' may be constructed of suitable size to design flooring, walls, and etc. Furthermore, when the composite base plate 1' is constructed with interlocking mechanisms 30 of component base plates 1 made to project beyond the peripheral edges of the backing board 40, the composite base plate 1' may be aligned and/or joined with other composite base plates 1' to produce a yet larger base plate. In this way, multiple composite base plates 1' of enlarged sizes (such as 24 inches by 24 inches, or 24 inches by 48 inches) may be stored and transported for easy handling and quick assembly of yet larger base plate assemblies (such as 48 inches by 96 inches, or even larger).

In another aspect of the present invention, there is provided a method for printing custom colors and high quality images to post-production base plates, including conventional base plates and base plates 1 according to the present invention, with an UV light flatbed printer.

The printing process employs a UV light printer for applying UV ink to a post-production base plate. Use of a UV light printer presents a "dry" printing method, wherein UV inks are applied under heat generated by the UV printer head, which allows the ink to bond to the three dimensional structure of a base plate. The method is performed by applying a post-production base plate, or multiple post-production base plates, to a support structure such as a backing board 40; and feeding the backing-board-mounted base plate into the UV light printer. The UV light printer applies UV inks to the base plate, with the inks dried in place by application of UV light emitted from UV bulbs, which are incidentally heated to a temperature of 300° F. to 500° F., to thereby apply a color or image to the base plate. The printing method may, however, also be practiced with a "cold" UV printing process, by employing a UV printer which uses UV bulbs that emit the necessary UV light for reacting with the UV inks without also incurring the elevated temperatures above. A cold UV process has the benefit of achieving the desired UV printing, while reducing energy costs and minimizing the potential for heating damage to the base plate (or other substrate) subjected to the UV printing. After passing through the UV light printed, the printed base plate is allowed to dry for 24 hours.

Preferably, the backing-board-mounted base plate is fed into the UV light printer while being subjected to a downward vacuum force; and, preferably, the backing board 40 is made of a vacuum enhancing material. Introduction of the base plate while mounted on a vacuum enhancing backing board 40, and while subjected to a downward vacuum force helps maintain the base plate in a flat orientation. In particular, it was found that if the base plate is introduced without the benefit of a downward vacuum force, then the heat from the UV printer head may cause the base plate to deform, as illustrated in FIG. 21. However, when introduced while mounted on a vacuum enhancing backing board 40, and while subjected to a downward vacuum force, the base plate was found to resist such deformation, as illustrated in FIG. 22.

Without being bound by any particular theory, it is believed that use of a downward vacuum force helps keep the base plate flat and at a constant distance from the UV printer heads; and the use of a vacuum enhancing backing board 40 enhances the effectiveness of the downward vacuum force in this regard.

The printing method of the present invention allows for unique colors and high resolution images to be printed on the three dimensional structure of post-production base plates of any size, in a cost effective manner for the market. Images created by this printing process may be applied to a base plate in one homogeneous design or shape, with the ink bonded to the base plate material (e.g., polystyrene) in a "dry" printing process. Advantageously, it has been found that the bonding of the UV ink to the base plate material is of considerably higher durability, such that colors and images printed to base plates via a UV light printer display considerably greater scratch-resistance than that displayed by conventional methods of post-production color and image application (e.g., hand painting).

Surprisingly, it was found that when the printing method is combined with the improved node structure of the base plates according to the present invention, there was achieved improved printing results as compared to those results achieved when feeding conventional base plates into the UV light printer. In particular, images printed on base plates according to the present invention were observed to yield high-quality images that were viewable from a greater range of viewing angles than is possible with conventional base plates.

Without being bound by any particular theory, it is believed the improved printing results achieved by UV light printing on the inventive base plates 1 is due to a further synergy concerning the rounded bevel 109 and tapered cylindrical wall 106 of the nodes 10. In particular, it is considered the unique beveled and tapered shape of the nodes 10 results in an increased "running" of UV inks over the rounded bevel 109 and down the tapered cylindrical wall 106 before drying. This increased "running" of the UV inks enlarges the surface area over which the inks are applied on the base plate 1, thereby creating a more homogenous application of the printed color or image with a greater range of viewing angles. It is believed conventional base plates are incapable of achieving similar results due to the studs thereon lacking the beveled and tapered configuration of the inventive nodes 10.

The present invention provides base plates with an improved node structure that allows consumers to utilize multiple different types of conventional interlocking building blocks (e.g., LEGO bricks; DUPLO bricks; etc.). The improved node structure locks building blocks more firmly in place, while also providing a larger surface area that enhances the visual appearance of printed media applied to the base plate. The inclusion of an engineered backing provides the base plates with greater strength and durability; and the further inclusion of an integrated interlocking mechanism enables consumers to assemble ever larger composite base plates from any number of component base plates, while enhancing durability and reducing the appearance of seems at the tile-to-tile connections.

The printing method according to the present invention provides a process for consumers to select and apply custom colors, images, and themes (including four plus color images) onto post-production base plates. With this printing method, high quality printing may be performed to post-production base plates to produce images with enhanced scratch-resistance.

Together the inventive base plates and printing method enable a consumer to apply custom high quality prints onto a post-production base plates of any given size. With the interlocking capability of the base plates, there is no limit to the size of composite base plate that may be produced with a custom print applied thereto. Furthermore, with the improved node structure, the integrated interlocking mechanism, and the inventive printing method, the present invention makes it possible to produce base plates with custom prints that are applied over a greater surface area of the base plate, at optically advantageous angles that increase the available viewing angles of the custom print, and with reduced appearance of seams between adjacent tiles, such that a more homogenous and high quality appearance can be attained than has previously been possible via conventional means.

Although the present invention is described with reference to particular embodiments, it will be understood to those skilled in the art that the foregoing disclosure addresses exemplary embodiments only; that the scope of the invention is not limited to the disclosed embodiments; and that the scope of the invention may encompass additional embodiments embracing various changes and modifications relative to the examples disclosed herein without departing from the scope of the invention as defined in the appended claims and equivalents thereto.

For example, though the exemplary base plate illustrated in the drawings employs barrels that are sized and shaped for mating with the studs of LEGO bricks, those skilled in the art will appreciate that base plates according to the present invention may also be constructed with barrels sized and shaped for mating with any type of interlocking building brick, including DUPLO bricks, MEGA BLOKS bricks, etc. Also, though the exemplary base plate shows only one type of barrels, for mating with one type of interlocking building brick, those skilled in the art will appreciate that base plates according to the present invention may also be constructed with multiple types of barrels of different sizes and shapes for facilitating simultaneous mating engagement with multiple types of interlocking building bricks.

Also, though the printing method of the present invention is contemplated primarily for use in applying colors and images to base plates for use with interlocking building bricks, those skilled in the art will appreciate that the printing method may be applied to many other types of substrates; and even other post-production products such as plastic models, plastic sculptures, and plastic toy parts. For example, other post-production products may be adhered to a base plate (or backing board) and the printed with the inventive printing method.

While the disclosed methods may be performed by executing all of the disclosed steps in the precise order disclosed, without any intermediate steps therebetween, those skilled in the art will appreciate the methods may also be performed: with further steps interposed between the disclosed steps; with the disclosed steps performed in an order other than the exact order disclosed; with one or more disclosed steps performed simultaneously; and with one or more disclosed steps omitted.

To the extent necessary to understand or complete the disclosure of the present invention, all publications, patents, and patent applications mentioned herein are expressly incorporated by reference herein to the same extent as though each were individually so incorporated. No license, express or implied, is granted to any patent incorporated herein. Ranges expressed in the disclosure include the endpoints of each range, all values in between the endpoints, and all intermediate ranges subsumed by the endpoints.

The present invention is not limited to the exemplary embodiments illustrated herein, but is instead characterized by the appended claims.

What is claimed is:

1. A method of printing on a base plate, comprising:

applying ultraviolet ink to a base plate from an ultraviolet light printer, wherein:

the base plate is adapted for supporting a plurality of interlocking building bricks, the base plate comprising a planar sheet having a top surface and a bottom surface, with a plurality of nodes projecting from the top surface, the plurality of nodes comprises a node having a vertical cylindrical wall and a horizontal top wall, the vertical cylindrical wall tapering along its vertical height, and the node comprising a bevel extending around a circumference of the node at an edge where the vertical cylindrical wall transitions to the horizontal top wall, and the ultraviolet ink is applied to at least the top surface of the planar sheet, and to the plurality of nodes.

2. The method of printing on a base plate according to claim 1, wherein the ultraviolet ink is applied to the planar sheet while the base plate is supported on a backing board.

3. The method of printing on a base plate according to claim 1, wherein the ultraviolet ink is applied to the planar sheet while the base plate is subjected to a downward vacuum force.

4. The method of printing on a base plate according to claim 3, wherein the ultraviolet ink is applied to the planar sheet while the base plate is supported on a backing board made of a vacuum enhancing material.

5. The method of printing on a base plate according to claim 1, wherein a diameter of the vertical cylindrical wall of the node tapers continuously from a base of the node to the bevel extending around the circumference of the node, and the ultraviolet ink is applied to at least a portion of the vertical cylindrical wall.

6. The method of printing on a base plate according to claim 1, wherein the vertical cylindrical wall of the node has a taper angle ranging from 2° to 4°, as measured relative to an axis extending perpendicular to top surface of the planar sheet, and the ultraviolet ink is applied to at least a portion of the vertical cylindrical wall.

7. The method of printing on a base plate according to claim 1, wherein the vertical cylindrical wall of the node has a taper angle of 3°.

8. The method of printing on a base plate according to claim 1, wherein:

the bevel has a radius of curvature ranging from 0.015 inch to 0.017 inch.

9. The method of printing on a base plate according to claim 8, wherein:

the bevel has a radius of curvature of 0.016 inch.

10. The method of printing on a base plate according to claim 1, wherein:

the ultraviolet ink is dried in place by application of ultraviolet light from one or more ultraviolet bulbs that are heated to a temperature within a range from 300° F. to 500° F.

11. The method of printing on a base plate according to claim 1, wherein:

the ultraviolet ink is applied to the planar sheet while the base plate is supported on a backing board on which a second base plate is also supported, and ultraviolet ink is also applied to a planar sheet of the second base plate.

* * * * *